Patented July 21, 1942

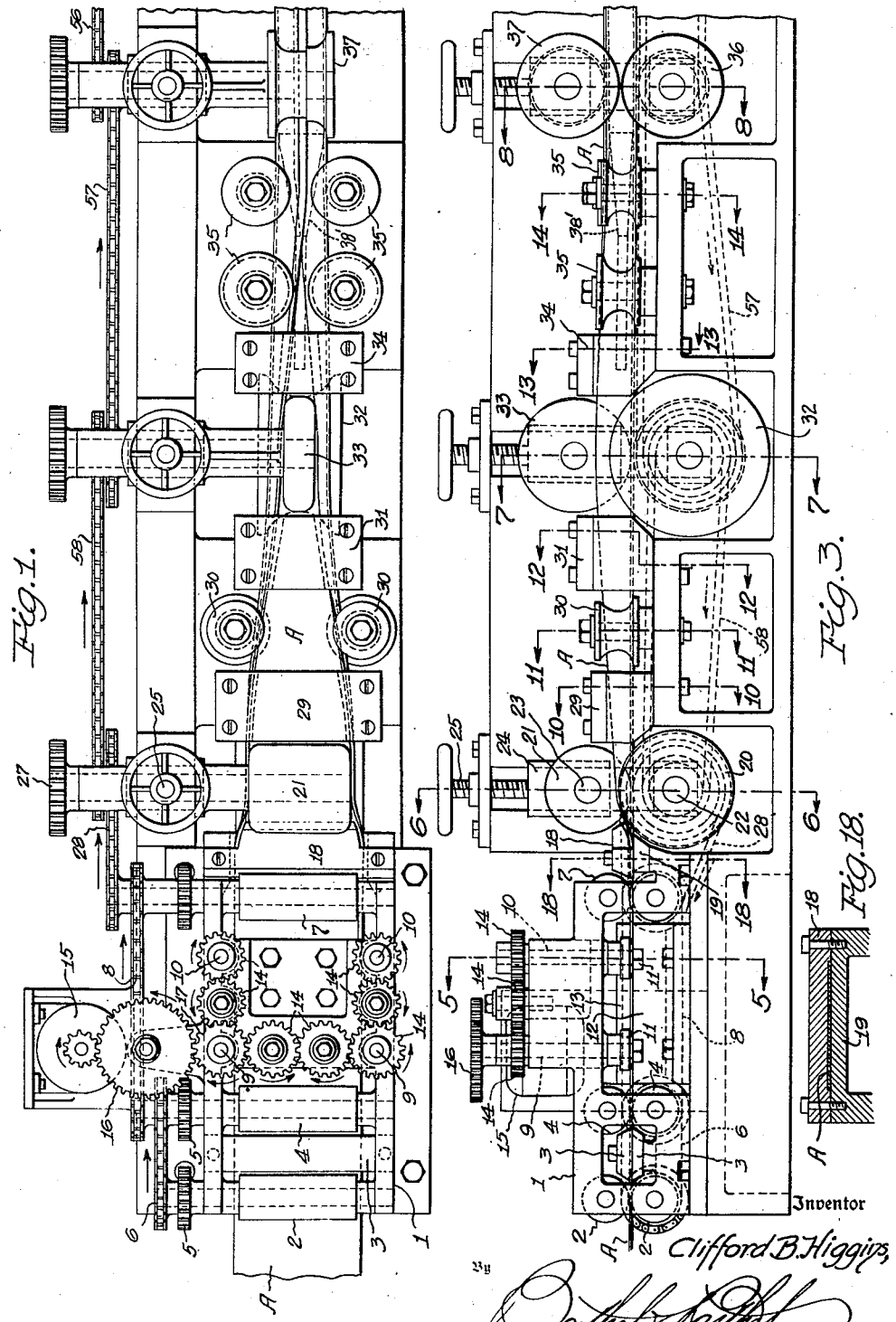

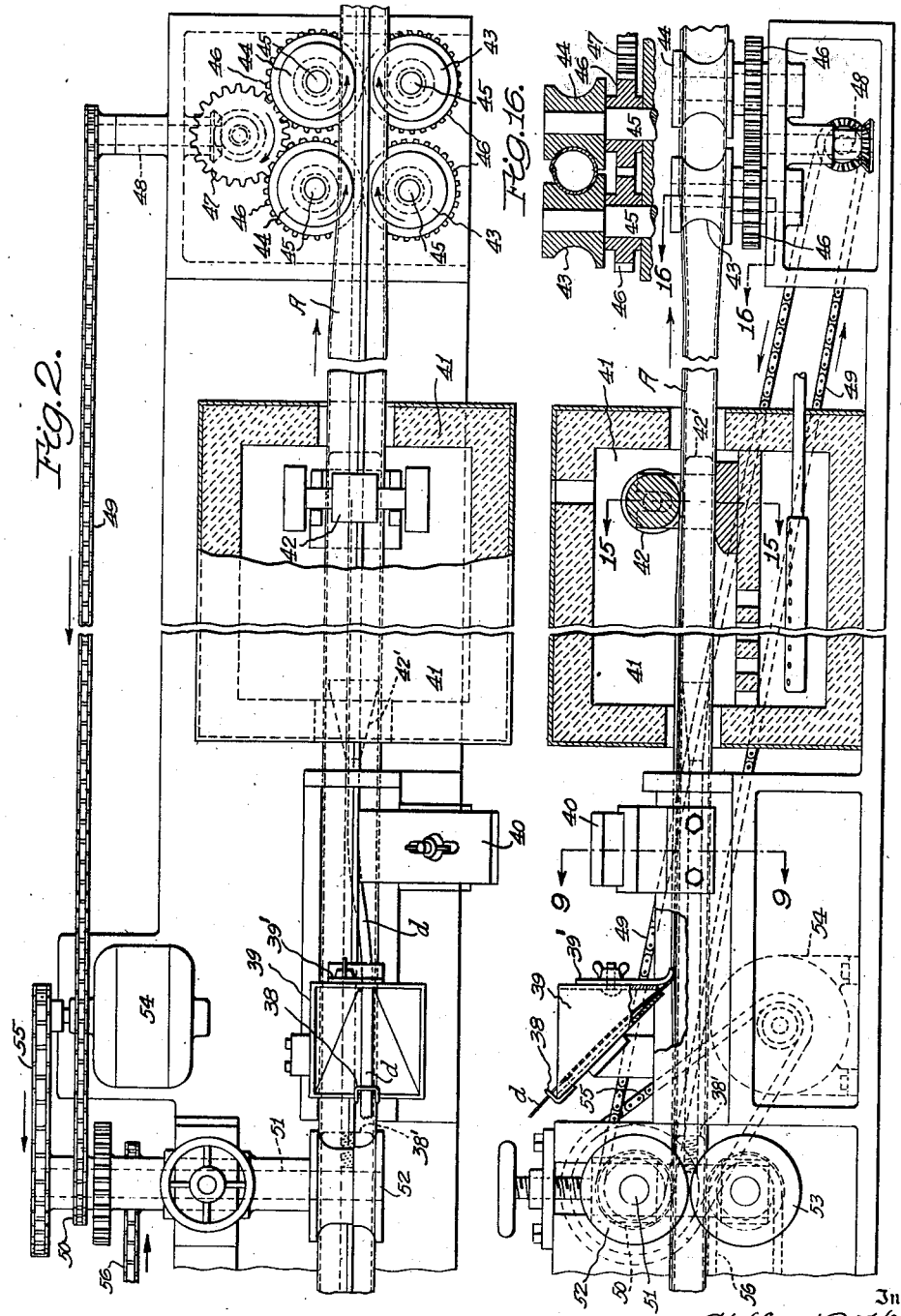

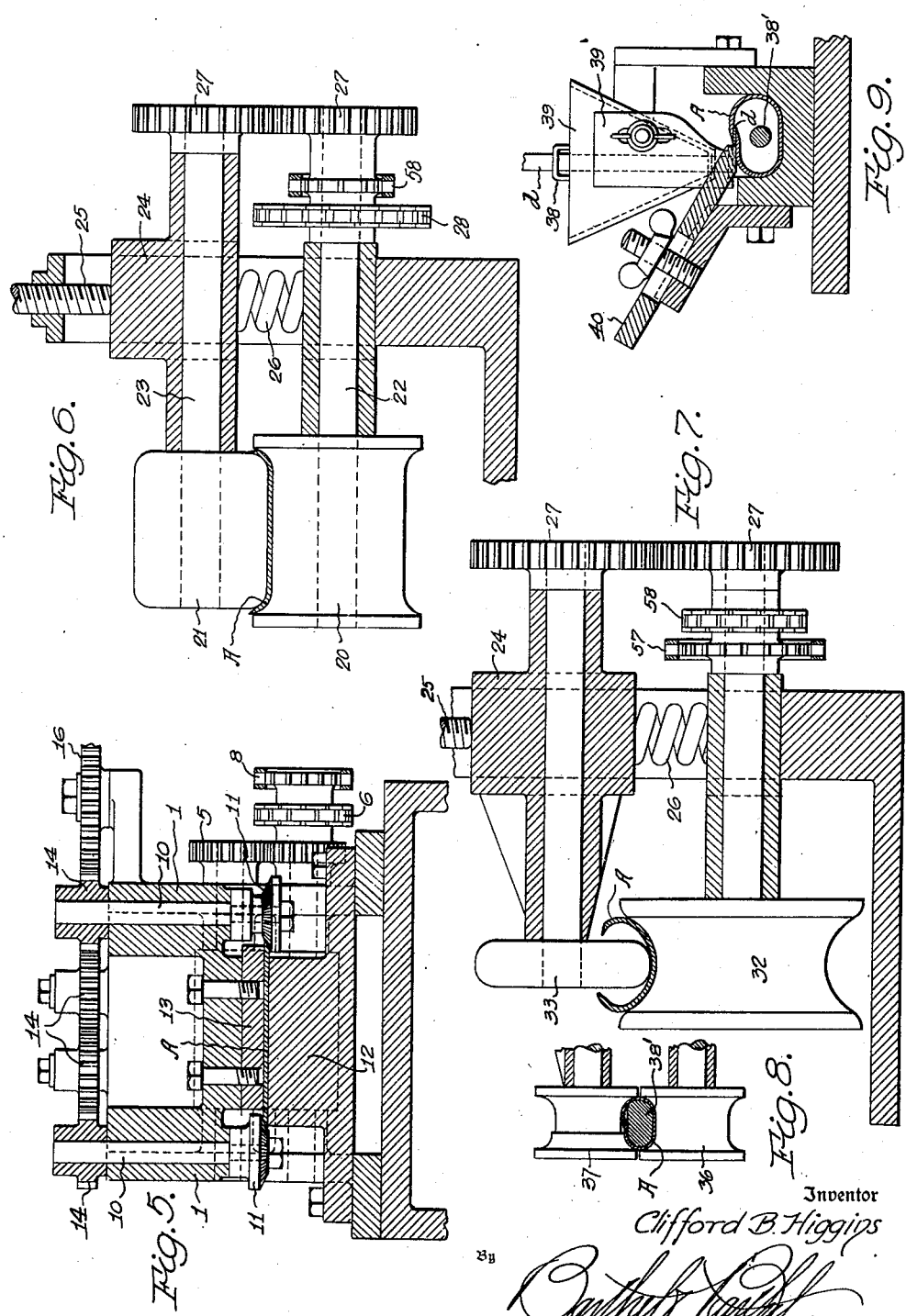

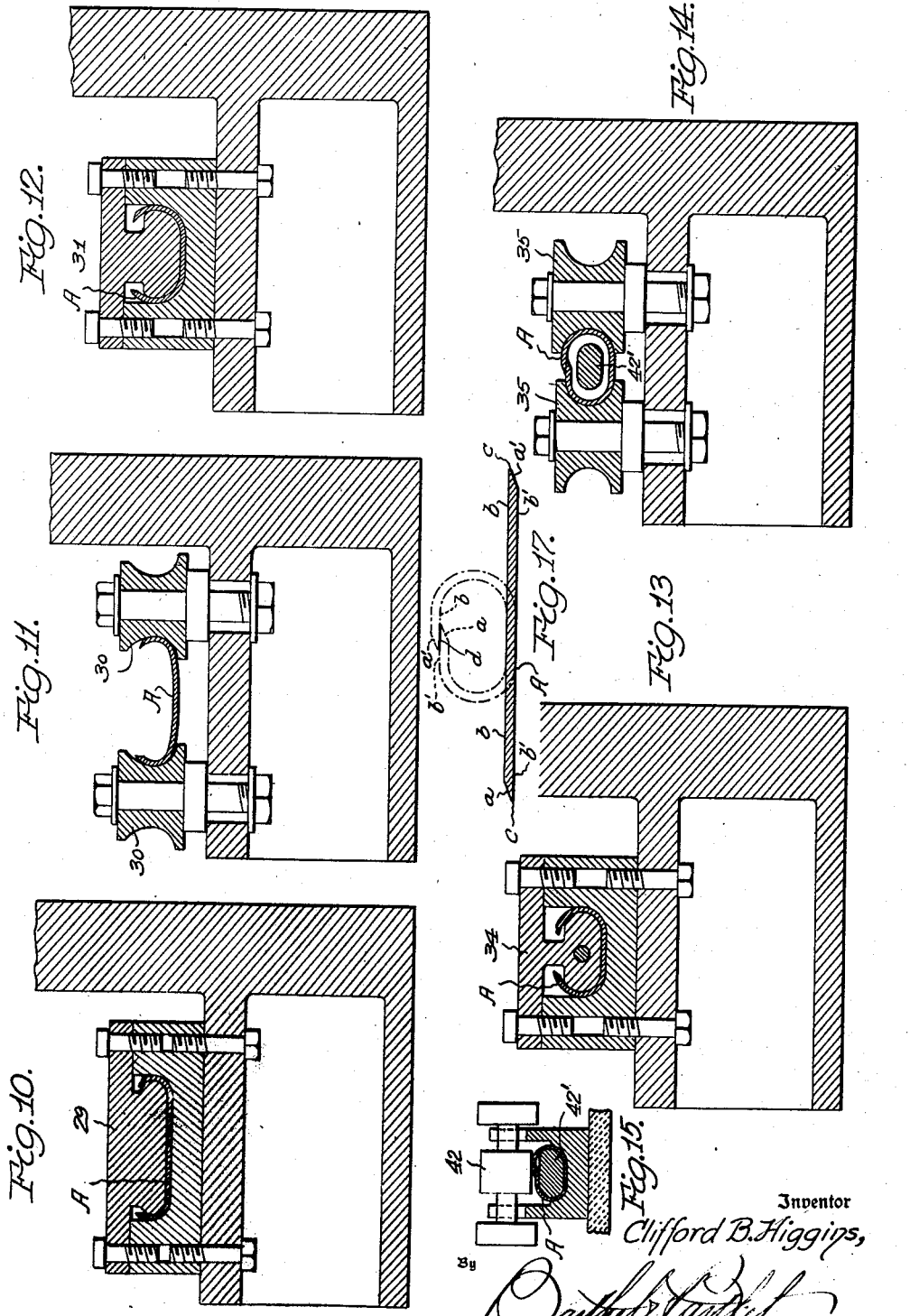

2,290,184

UNITED STATES PATENT OFFICE 2,290,184

MEANS FOR AND METHOD OF FORMING TUBING

Clifford B. Higgins, Detroit, Mich.

Application June 27, 1938, Serial No. 216,000

6 Claims. (Cl. 113—33)

This invention relates to a method of making tubing from thin strip stock of non-ferrous sheet metal, and also to means for practicing such method to facilitate production.

The most common method of producing thin walled tubing of small diameter, is to draw or extrude metal through dies, but the cost of tubing so produced is high as compared with tubing formed from strip sheet metal rolled into tubular form with the edges of the strip joined in a seam, which seam has been formed in various ways, as by interlocking the edges of the strip and also by brazing or welding together the abutted edges of the strip or overlapped edge portions thereof. Lock seam tubing is found to be objectionable in that the seam is formed with a plurality of thicknesses of metal which increases the thickness of the seam and forms an objectionable projecting rib at the surface of the tube, which rib is more rigid than the wall of the tube and is liable to be ruptured upon bending of the tube. A seam formed by brazing or welding together, the abutting edges of the stock, is unsatisfactory because of the limited areas of the abutting edges of the metal and consequent weakness of the seam and breaks in its continuity of weld. Where the edges of the strip are overlapped and united, the seam thus produced forms an objectionable projecting rib on the tube and when pressure is applied during the welding operation as disclosed in United States Patent 1,511,849 of October 14, 1924, which pressure is applied to cause the metal of the overlapped portions to flow and reduce the thickness of the seam, metal is extruded along the seam and must be removed, and due to this flow of the metal when brazing is employed, the brazed seam is weakened or destroyed by the flow of metal, making it necessary to resort to electric welding where the stock is of sufficient thickness to make such welding feasible, as disclosed in the above mentioned patent.

An object of the present invention is to provide a method of forming tubing from thin strip stock of non-ferrous sheet metal, wherein the strip is formed longitudinally into tubular form and the edge portions united in a continuous brazed seam which seam is so constructed as to insure perfect brazing and maximum strength of braze without subjecting the seam during the brazing operation, to pressure sufficient to cause the metal to flow, the construction of the seam also being such as to preclude relative movement between the overlapped portions of the strip, the method providing a continuously brazed seam of substantially the same thickness as that of the wall of the tube and of a strength which will permit of subsequent drawing of the tube to size and internal and external smoothness.

A further object of the present invention is to provide means for performing the present method with a continuing movement of the work, thus facilitating the manufacture of tubing of any desired length with a brazed seam of uniform maximum strength; said means including means for feeding the strip material, means for chamferring the longitudinal edges of the strip during its travel to reduce the thickness of these edges, means for forming the strip into tubular form of oval shape in cross section with its chamferred edge portions overlapped, means for guiding a ribbon or wire of bonding material into the space between the opposed flat sides of the overlapped edge portions of the strip, and means for subsequently applying heat to form a brazed seam, means being provided to hold the overlapped portions pressed into contact with the interposed ribbon or wire of bonding material with a very limited pressure during the brazing operation.

It is also an object to provide certain other new and useful features in the construction and arrangement of the several instrumentalities employed in producing such tubing in long lengths, all as hereinafter more fully set forth, reference being had to the accompanying drawings in which—

Figures 1 and 2 comprise a plan view of a machine illustrative of the invention and of means for carrying out the present method, parts being broken away and in section to more fully disclose the construction;

Fig. 3 is a side elevation of Fig. 1;

Fig. 4 is a side elevation of Fig. 2 with parts in longitudinal section and with parts broken away and in section to more clearly disclose the construction;

Fig. 5 is an enlarged transverse section substantially upon the line 5—5 of Fig. 3;

Fig. 6 is an enlarged transverse section substantially upon the line 6—6 of Fig. 3;

Fig. 7 is an enlarged transverse section substantially upon the line 7—7 of Fig. 3;

Fig. 8 is a transverse section substantially upon the line 8—8 of Fig. 3;

Fig. 9 is an enlarged transverse section substantially upon the line 9—9 of Fig. 4;

Figs. 10, 11 and 12 are enlarged transverse sections substantially upon the lines 10, 11 and 12, respectively of Fig. 3;

Figs. 13 and 14 are enlarged transverse sections substantially upon the lines 13 and 14 respectively, of Fig. 3;

Fig. 15 is a transverse sectional detail substantially upon the line 15—15 of Fig. 4;

Fig. 16 is a sectional detail substantially upon the line 16—16 of Fig. 4;

Fig. 17 is an enlarged transverse sectional detail of the metal strip showing, in dotted lines, the formed strip with chamfered and overlapped edge portions, and Fig. 18 is an enlarged sectional detail substantially upon the line 18—18 of Fig. 3.

The method included within the present invention, includes the step of preforming the longitudinal edge portions of the strip stock A prior to overlapping and uniting these edge portions so that when overlapped, these edge portions will have a combined thickness substantially equal to the thickness of the strip, thus making unnecessary subsequent reduction in thickness of the seam to avoid the formation of the tube with a projecting rib, said preforming consisting of bevelling said edge portions as at $a$, $a'$, Fig. 17, with said strip held flat, the bevel $a$ being at the upper flat side $b$ of one edge portion and extending outwardly to substantially the edge of the lower flat side $b'$, and the other bevel $a'$ being at the lower flat side $b'$ of the strip and extending outwardly to substantially the edge of the upper flat side $b$, said bevels cutting through the edge surfaces of the strip adjacent the flat sides thereof and forming substantially sharp edges $c$ along the edges of the strip.

A further step in the present method consists in forming a strip longitudinally into tubular form of substantially elliptical shape in cross section, or as an oblong with rounded ends and connecting, substantially flat parallel upper and lower sides and with the edge portions of the strip overlapped along the longitudinal center line of one of said sides, the flat surfaces $b$, $b'$ of the overlapped portions being in opposed relation and preferably disposed in a horizontal plane, the width of this overlap being substantially equal to the width of each bevel so that the combined thicknesses of the overlapped and bevelled edge portions, will be substantially equal to the thicknesses of the strip forming the wall of the tube.

It is also a step in the present method to feed into the space between the overlapped surfaces $b$, $b'$ a thin ribbon $d$ of bonding metal with a movement continuous with the longitudinal movement of the strip A, thus accurately locating the bonding metal exactly where it is most effective in forming a perfect brazed connection, the ribbon providing just the proper amount of bonding material to make a perfect bond and to fill the space between the surfaces to be united, to the exclusion of all metal oxide or other matter liable to prevent continuous brazing, the uniting of these surfaces of the seam being effected by applying just sufficient pressure during the application of brazing heat to hold these surfaces in firm contact with said bonding metal. Therefore the brazed seam is not distorted or disrupted by flow of metal caused by heavy pressure, and because of the flat horizontally disposed position of the overlapped surfaces, there is no tendency toward relative movement of these surfaces during the brazing operation.

The machine shown in the accompanying drawings is illustrative of means for carrying out the present method and includes a supporting frame 1 of extended length upon the forward end of which a series of pairs of opposed feed rolls is mounted for feeding longitudinally, a strip of thin non-ferrous sheet metal, this strip A being of any desired length and of a width to form, when rolled into tubular shape, the desired diameter of tubing. This strip material A comes from the rolling mill wound upon itself in the form of a spiral roll (not shown) from which it is fed endwise between the first pair of rolls 2 and then passes on between opposed guiding plates 3 and between the second pair 4 of opposed feed rolls. The upper and lower rolls of each pair of feed rolls are geared together by means of suitable spur gears 5 and the pairs of rolls are connected for simultaneous rotation by means of a chain 6 engaging sprocket wheels on the ends of the shafts of the upper roll of each pair.

A third pair of feed rolls 7 is mounted upon the supporting frame at a distance beyond the feed rolls 4 and this third pair of rolls is driven simultaneously with the other feed rolls by means of a sprocket chain 8 engaging a sprocket wheel mounted upon the shaft of the upper roll of said pair, and the rolls of this pair are connected for simultaneous rotation by gears 5 in a manner similar to that of the other pairs of feed rolls.

Mounted within suitable bearings on the supporting frame between the pairs of rolls 4 and 7, are vertical shafts 9 and 10 arranged in pairs, one pair at each side of the longitudinal travel of the strip A and upon the lower end of each of these shafts is secured a rotary cutter 11 each having a bevelled cutting face, with the cutters upon the shafts 9 and 10 at one side of the strip A, disposed with their cutting faces downwardly to form a bevel $a$ along one edge of the strip as it is caused to travel longitudinally, and the pair of cutters 11 on the shafts 9 and 10 at the opposite edge of the strip, being disposed with their bevelled cutting faces at the upper sides of the cutters so that they will form a bevel $a'$ along that edge of the strip, which strip is supported throughout its width by a block 12 on the frame across which the strip travels between the upper surface of this block and a guide plate 13. The strip is therefore supported throughout its width as it travels over the block 12 and the edges of the strip are supported so that the engagement of the cutters 11 therewith will make a clean cut and will not distort the edges of this thin metal strip A by the bevelling cutting action of the cutters 11 which are all simultaneously driven in the proper direction by means of a train of gearing 14 applied to the upper ends of the shafts 9 and 10 and transmitting motion across from one pair of shafts at one side of the strip to the other pair at the opposite side. Power for driving the several rotary cutters 11 is supplied by an electric motor 15 having a vertical shaft upon the upper end of which is mounted a small spur gear which is in mesh with a large gear 16 and which in turn, meshes with a smaller gear 17 mounted upon the upper end of the vertical shaft 9.

Beyond the third pair of feed rolls 7 in the direction of travel of the strip A, is a guide plate 18 (Fig. 18) held in opposed relation to a block 19 on the frame, said plate 18 being recessed at its lower side to receive the strip A for guiding the strip against lateral movement and also to hold the strip flat.

As the strip A issues from between the guide members 18 and 19, it passes between rolls 20 and 21, the lower roll 20 having a curved peripheral surface and the upper roll being correspondingly formed to fit within the curve of the lower roll, the strip being thus formed with upturned and curved side edge portions. The lower roll 20 is mounted upon a shaft 22 having a fixed bearing on the frame of the machine and the roll 21 is mounted upon a shaft 23 mounted in a bearing block 24 slidable vertically within a guide slot in a member of the frame, said bearing block 24 being adapted to be moved within its guide slot to move the roll 21 toward the roll 20, by means of an adjusting screw 25, the lower end of which engages the block to move the same downwardly against the action of a coiled spring or springs 26. These rolls 20 and 21 are geared together by means of gears 27 upon the ends of their shafts to rotate simultaneously in the proper direction and motion is transmitted from the shaft of the feed roll 7 to the shaft 22 by means of a sprocket chain 28.

Beyond the rolls 20 and 21 in the direction of travel of the strip A, is a die block 29 through which the strip passes to further form the edge portions of the strip, curving them upwardly and inwardly as shown in Fig. 10, and beyond this die block 29, is a pair of rolls 30 mounted for free rotation upon vertically extending fixed studs, the peripheries of these rolls 30 as shown in Fig. 11, being formed with curved grooves to engage the edge portions of the strip and further curl these edges inwardly toward each other. From these rolls 30, the strip passes through a second die block 31 shown in Fig. 12 and shaped to further curl the edges of the strip inwardly toward each other.

Beyond the block 31 in the direction of travel of the strip, is a pair of rolls 32 and 33 mounted upon the ends of horizontally disposed shafts to engage, the roll 32 the exterior and the roll 33 the interior of the partially formed strip (Fig. 7) to further curl its edge portions inwardly toward each other, the shafts upon which these rolls are mounted, being mounted upon the frame in a manner similar to the rolls 20 and 21 for adjustment toward and from each other. From between the rolls 32 and 33, the strip passes through a third die block 34 (Fig. 13) which further shapes the strip, curling its edge portions inwardly toward each other and forming the strip into oblong shape in cross section, and to finally bring the strip into tubular form with its edge portions overlapped, two pairs of forming rolls 35 (Fig. 14) are provided, these rolls having properly curved peripheral grooves to engage and form the strip into the desired shape in cross section with the edge portions of the strip overlapped. The strip is finally formed into the desired shape in cross section, as shown in Fig. 8, by means of a pair of opposed rolls 36 and 37, the final shape of the tube being given by pressing the strip by means of the rolls 36 and 37 into firm contact with a mandrel 38' extending into the tube between said rolls, said rolls being mounted for adjustment toward and from each other by means similar to the mounting of the rolls 20 and 21.

By means of the several pairs of rolls, the strip is progressively formed into the desired oval shape in cross section with the bevelled edge portions of the strip overlapped, one edge portion of the strip being curved upwardly and inwardly with its bevelled surface $a$ at the inner side of the tube and with the surface of the edge portion of the strip opposite this bevel, extending in a horizontal plane and substantially flat. The opposite edge of the strip is curved upwardly and inwardly to bring its flat surface $b$ which lies opposite the beveled surface $a'$ of this edge portion, into overlapping relation with the flat surface $b'$ of the other edge portion, these edge portions being overlapped a distance substantially equal to the width of the bevels $a$ and $a'$, these bevels, when the edge portions are so overlapped, extending in parallel inclined planes and because of the bevelling of these edge portions of the strip, the combined thickness of the overlapped portions will be substantially equal to the thickness of the strip or wall of the tube. Because of the oval shape in cross section of the tube, the overlapped edge surfaces of the edge portions of the strip will attend in a substantially horizontal direction and will be flat, as shown in dotted lines in Fig. 17, and therefore the ribbon or wire $d$ of bonding metal may be fed into the space between these overlapped horizontal surfaces as the strip is fed through the machine and will be held in exactly the proper position between these surfaces to effect the best brazed connection between these surfaces and form a strong and continuous brazed joint. In view of the fact that the ribbon lies flat and fills the space between the overlapped parallel surfaces, all foreign matter will be excluded from the joint and a continuous brazing of the joint will be effected as the strip travels through the machine.

As shown in detail in Fig. 9, means is provided for directing the ribbon or wire $d$ into the space between the overlapped edge portions of the strip as this strip travels forwardly and said edge portions are gradually brought into overlapping relation, said means including an inclined guide plate 38 for the ribbon or wire forming the bottom of a flux receptacle 39 and a vertically adjustable guide plate 39' having a curved lower end to spread the flux upon the upper surface of the ribbon and remove the surplus, and a laterally adjustable guide plate 40 for guiding the ribbon and moving it laterally into the space between the overlapping edge portions of the strip just prior to the bringing of these edge portions into final overlapped relation.

The strip A having been formed into the desired oval shape in cross section with the beveled edge portions thereof overlapped and the ribbon or wire $d$ placed between the overlapped surfaces, the tube passes on through a suitable heating device or furnace 41 constructed in any suitable manner to heat the tube and ribbon and form a brazed joint between the overlapped edges. In order to hold or bring the overlapped edge portions into firm contact with the ribbon while the heat is applied and thus press these overlapped edges toward each other against a mandrel 42' within the tube, to insure their perfect brazing together, a weight roll 42 is mounted within a suitable guide bearing within the furnace chamber 41 to rest upon the upper of the overlapped edge portions of the tube wall and by its weight press said edge portion with a limited pressure, toward the lower of the overlapped edges and thus insure the proper brazing of these edges together as the strip travels through the heating chamber.

The tube which is oval shaped in cross section, passes from the heating chamber with the seam properly brazed and then passes on between pairs of rolls 43 and 44 to form the tubular member into true cylindrical form, these final forming rolls 43 and 44 (Fig. 16) being mounted upon vertical stub shafts 45 and connected by suitable spur gears 46 for simultaneous rotation, a driving gear 47 being provided to rotate the gears 46 in the proper direction, and motion is transmitted to this gear 47 in any suitable manner (Figs. 2–4) from a horizontal shaft 48 driven by means of a sprocket chain 49 passing over a sprocket wheel 50 on the horizontal shaft 51 upon which shaft a roll 52 similar to the roll 37 is mounted in opposed relation to a lower roll 53 similar to the roll 36, these rolls 52 and 53 being for the same purpose and mounted in the same manner as the rolls 36 and 37 for adjustment toward and from each other, and power is applied for driving the shaft 51, by means of an electric motor 54 the shaft of which is connected by a sprocket chain 55 with said shaft 51. The shaft 51 thus becomes a driving shaft for driving the rolls 43 and 44 by means of the sprocket chain 49 and from this shaft 51 motion is transmitted to the shaft of roll 53 and from said shaft by means of a sprocket chain 56, to the shaft on which the roll 36 is mounted, and from the shaft of this roll 36, motion is transmitted by a sprocket chain 57 for driving the shaft upon which the roll 32 is mounted, and in turn, motion is transmitted from this shaft to the shaft of the roll 21 by means of a sprocket chain 58 (Fig. 1). Therefore the several forming rolls are all simultaneously driven in the proper direction to feed the strip longitudinally while it is being formed into tubular form by the several pairs of rolls and several dies. Further, the interposition of the ribbon or wire d between the overlapped edge portions of the strip, feeds the ribbon or wire by the movement of the strip, into proper brazing position to make an uninterrupted brazed joint which is so strong that the tube may be subsequently drawn, if found desirable, to smooth it externally and internally and to form it to the exact desired diameter.

Having thus fully described my invention what I claim is:

1. A method of forming tubing from thin strip metal which method consists in bringing together the opposite edge portions of the strip into tubular form of approximately oval cross section with one wall thereof substantially flat and with said opposite edge portions substantially flat and overlapped along the longitudinal junction of said flat edge portions, inserting a ribbon of bonding metal between said overlapped edge portions of said strip, applying heat to unite said edge portions, and reshaping the united tube from an approximately oval cross section to an approximately circular cross section.

2. A method of forming tubing from thin strip sheet metal, which method consists in moving the strip longitudinally with a continuous movement, bringing together and overlapping the opposite edge portions of the strip during its longitudinal travel while bending said strip progressively during the continuing longitudinal travel of said strip into tubular form of approximately oval cross section with the overlapped edge portions of the strip substantially horizontal and flat and in spaced relationship, inserting a continuous ribbon of bonding metal between the overlapped edge portions of the strip by causing the longitudinal movement of the strip to draw said ribbon into position between said horizontal overlapped edge portions, applying heat to said overlapped edge portions of said strip during its travel to unite said edge portions in a continuously brazed junction, and reshaping the united tube from an approximately oval cross section to an approximately circular cross section.

3. Means for forming tubing from strip sheet metal, said means including means for feeding the strip longitudinally with a continuing movement, means for forming the strip during its longitudinal movement into tubular form of approximately oval cross section with edge portions of the strip overlapped and with said overlapped edges maintained flat and spaced in parallel relation, means for feeding a ribbon of bonding metal into the space between the flat overlapped edge portions of said strip, means for applying heat to the overlapped edge portions of said strip and to said ribbon of bonding metal to unite the overlapped edges of the strip in a brazed seam, and means for reshaping the united tube from an approximately oval cross section to an approximately circular cross section.

4. The method of forming tubing from thin strip sheet metal, which method consists in forming said strip longitudinally into tubular form of approximately oval cross section with the longitudinal edge portions overlapped and substantially flat with the flat surfaces of said edge portions in opposed relation and disposed in substantially horizontal planes, positively feeding a ribbon of bonding metal transversely edgewise into the space between said opposed flat horizontal surfaces of said edge portions, applying heat to said overlapped edge portions and said bonding metal to unite said opposed surfaces of said edge portions, and reshaping the united tube from an approximately oval cross section to an approximately circular cross section.

5. A machine for forming brazed seam tubing from strip sheet metal, said machine including a base frame of extended length, means for feeding said strip longitudinally, a series of pairs of opposed rolls journaled upon said frame at spaced intervals along the length of the strip for forming the strip into tubular form of approximately oval cross section with its edge portions maintained substantially flat and overlapped in spaced parallel relation, means for introducing a ribbon of bonding metal into the space between the flat faces of the overlapped edge portions of the strip as these edge portions are brought into overlapping relation to cause said overlapped edge portions to engage the ribbon as the strip is fed longitudinally and draw said ribbon into place between said overlapped edge portions, means for applying heat to the formed tube with its overlapped edge portions and interposed ribbon to form a continuous brazed seam as the tube travels longitudinally of the machine, and means for reshaping the united tube from an approximately oval cross section to an approximately circular cross section.

6. Apparatus for forming soldered tubing, comprising means for bringing together the opposite longitudinal edges and forming a strip of metal into tubular form of approximately oval cross section with said longitudinal edges approximately flat and in spaced apart relationship, means for feeding a ribbon of solder into position adjacent said flat edges and parallel thereto, means for positively forcing the solder ribbon edgewise into the space between the opposed edges, heating means to melt the solder to unite the tube, and means for reshaping the united tube from an approximately oval cross section to an approximately circular cross section by applying pressure on opposite sides of the lap seam.

CLIFFORD B. HIGGINS.